(12) United States Patent
Hente et al.

(10) Patent No.: US 8,188,673 B2
(45) Date of Patent: May 29, 2012

(54) ORGANIC LIGHT EMITTING DIODE ARRANGEMENT

(75) Inventors: Dirk Hente, Wuerselen (DE); Joseph Hendrik Anna Maria Jacobs, Eygelshove (NL); Conrad Wilhelmus Adriaan Verjans, Landgraaf (NL); Eberhard Waffenschmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 406 days.

(21) Appl. No.: 12/523,168

(22) PCT Filed: Jan. 17, 2008

(86) PCT No.: PCT/IB2008/050172
§ 371 (c)(1),
(2), (4) Date: Jul. 15, 2009

(87) PCT Pub. No.: WO2008/090497
PCT Pub. Date: Jul. 31, 2008

(65) Prior Publication Data
US 2010/0026204 A1 Feb. 4, 2010

(30) Foreign Application Priority Data
Jan. 22, 2007 (EP) .................................... 07100925

(51) Int. Cl.
*H05B 41/16* (2006.01)
(52) U.S. Cl. ...................... 315/247; 315/209 R; 315/291
(58) Field of Classification Search .................. 315/210, 315/211, 216, 224, 209 R, 291, 247, 307, 315/308
See application file for complete search history.

(56) References Cited

U.S. PATENT DOCUMENTS

| | | | |
|---|---|---|---|
| 5,349,595 A | 9/1994 | Ogawa et al. | |
| 6,523,976 B1 | 2/2003 | Turnbull et al. | |
| 6,724,376 B2 | 4/2004 | Sakura et al. | |
| 6,798,152 B2 * | 9/2004 | Rooke et al. | 315/209 R |

(Continued)

FOREIGN PATENT DOCUMENTS

CA 2464843 A1 10/2005

(Continued)

OTHER PUBLICATIONS

Brandon et al: "Printed Microinductors on Flexible Substrates for Power Applications"; IEEE Transactions on Components and Packaging Technologies, vol. 26, No. 3, Sep. 2003, pp. 517-523.

*Primary Examiner* — Vibol Tan

(57) ABSTRACT

Organic light emitting diode arrangement Organic light emitting diode arrangements (1) are, to protect them against an effect of a switch-on, provided with circuits (31-36) for, during a first time interval that follows a switch-on, limiting a current through the organic light emitting diode arrangement (1) more and for, during a second time interval that follows the first time interval, limiting the current less. The circuit (31-36) may be passive such as a negative temperature coefficient resistor (31) or a series inductor (32) possibly with a freewheel diode (40) or may be active such as a switchable resistor (33) that is not bridged during the first time interval and that is bridged during the second time interval or a switchable resistor that is bridged in response to a detection of a value of the current exceeding a threshold value or such as a part of a converter (63) that is controlled in response to a detection of a value of the current.

5 Claims, 11 Drawing Sheets

U.S. PATENT DOCUMENTS

| | | | |
|---|---|---|---|
| 7,999,484 B2 * | 8/2011 | Jurngwirth et al. | 315/247 |
| 2004/0104687 A1 * | 6/2004 | Hu et al. | 315/169.3 |
| 2006/0001381 A1 * | 1/2006 | Robinson et al. | 315/185 R |
| 2006/0279228 A1 | 12/2006 | Kato | |
| 2011/0102417 A1 * | 5/2011 | Chen et al. | 345/214 |

FOREIGN PATENT DOCUMENTS

| | | |
|---|---|---|
| WO | 03000025 A2 | 1/2003 |
| WO | 2005015640 A1 | 2/2005 |
| WO | 2006056052 A1 | 6/2006 |

* cited by examiner

ORGANIC LIGHT EMITTING DIODE ARRANGEMENT

FIELD OF THE INVENTION

The invention relates to an organic light emitting diode arrangement, and also relates to a device comprising such an organic light emitting diode arrangement.

BACKGROUND OF THE INVENTION

Organic light emitting devices are highly capacitive arrangements representing a low impedance connection when being turned on. For example, WO2005015640 discloses an organic light emitting device to be driven at high voltages. However, when being turned on, high inrush currents may damage the organic light emitting device.

SUMMARY OF THE INVENTION

It is an object of the invention, to provide an organic light emitting diode arrangement, that comprises a protection against an effect of a switch-on.

Thereto, the organic light emitting diode arrangement is defined by comprising a circuit for, during a first time interval that follows a switch-on, limiting a current through the organic light emitting diode arrangement more than during a second time interval that follows the first time interval.

The circuit for, during the first time interval that follows the switch-on, limiting the current through the organic light emitting diode arrangement, forms a protection against an effect of a switch-on. Owing to the fact that an organic light emitting diode arrangement is a highly capacitive arrangement that represents a low impedance connection when being turned on, an inrush current that has a too high value may damage the organic light emitting diode arrangement. By limiting the inrush current, any damage from the inrush current may be prevented. The fact, that the circuit limits the current through the organic light emitting diode arrangement during the first interval more than during the second time interval that follows the first time interval, results in an acceptable efficiency of the protected organic light emitting diode arrangement, owing to the fact that the protection is mainly offered when necessary and is reduced when not necessary.

In other words, during the first time interval the current through the organic light emitting diode arrangement is limited according to a first limitation, and during the second time interval the current through the organic light emitting diode arrangement is limited according to a second limitation, the second limitation resulting in a smaller impact than the first limitation or resulting in no limitation at all and/or no impact at all.

An embodiment of the organic light emitting diode arrangement is defined by the circuit comprising a passive circuit. Usually a passive circuit does not need to be controlled and is therefore relatively simple.

An embodiment of the organic light emitting diode arrangement is defined by the circuit comprising a negative temperature coefficient resistor. A negative temperature coefficient resistor has a relatively large resistance value when being cold and has a relatively small resistance value when being heated up.

An embodiment of the organic light emitting diode arrangement is defined by the circuit comprising a series inductor. A series inductor has a relatively large impedance value when a current starts flowing through this inductor and has a relatively small impedance value when the current has been flowing through this inductor for a while and is only slowly changing. Compared to a negative temperature coefficient resistor, an inductor does not need to be resetted and does not dissipate any power in an ideal situation. For commutation purposes, a freewheel diode may be coupled serially to the series inductor and in parallel to a switchable DC source, to avoid large voltage spikes when turning the DC source off. In case of using a switchable AC source with a rectifier bridge, the rectifier bridge may take care of the commutation.

An embodiment of the organic light emitting diode arrangement is defined by the organic light emitting diode arrangement being a layered arrangement comprising a first layer with an organic light emitting diode and a second layer with the series inductor. The series inductor may for example be a spiral inductor on a flex foil. Higher impedance values may be reached by sandwiching the flex foil between layers of ferrites and/or mu metals.

An embodiment of the organic light emitting diode arrangement is defined by the circuit comprising an active circuit. Usually an active circuit performs a switching function. Compared to a passive circuit, an active circuit may be more accurate.

An embodiment of the organic light emitting diode arrangement is defined by the circuit comprising a switchable resistor that is not bridged during the first time interval and that is bridged during the second time interval. The bridging may for example be realized by means of a transistor or a thyristor or a triac or a relais etc. controlled by a timing circuit and a threshold detector.

An embodiment of the organic light emitting diode arrangement is defined by the circuit comprising a switchable resistor that is bridged in response to a detection of a value of the current exceeding a threshold value. The bridging may for example be realized by means of a transistor or a thyristor or a triac or a relais etc. controlled by a current detector and a threshold detector.

An embodiment of the organic light emitting diode arrangement is defined by the circuit forming part of a converter that is controlled in response to a detection of a value of the current. The converter may for example be a DC to DC converter or an AC to DC converter controlled by a current detector.

An insight may be, that an organic light emitting diode arrangement is a highly capacitive arrangement that represents a low impedance connection when being turned on. A basic idea may be, that a current through the organic light emitting diode arrangement should be limited after being turned on until a value of the current has decreased sufficiently.

A problem, to provide an organic light emitting diode arrangement, that comprises a protection against an effect of a switch-on, is solved. The organic light emitting diode arrangement is further advantageous, in that the protected organic light emitting diode arrangement has an acceptable efficiency.

These and other aspects of the invention are apparent from and will be elucidated with reference to the embodiments described hereinafter.

DETAILED DESCRIPTION OF EMBODIMENTS

Figure 1:
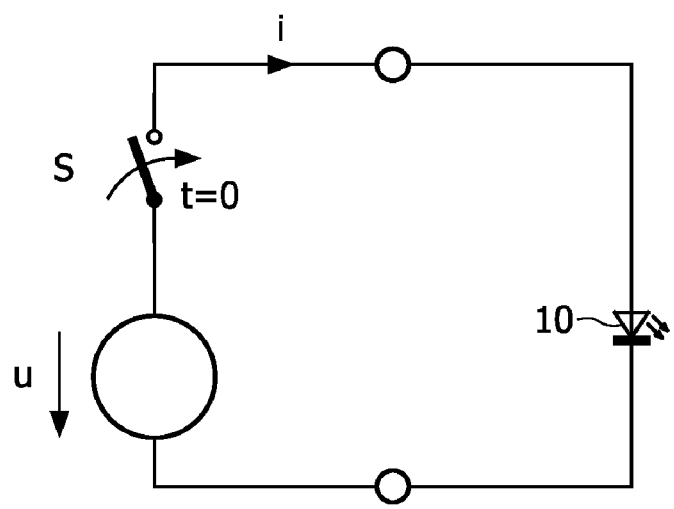
FIG. 1 shows an organic light emitting diode coupled to a source.

The organic light emitting diode 10 shown in the FIG. 1 is coupled to a source u,i for generating a voltage u and a current i via a switch S that is closed at a time t=0.

Figure 2:
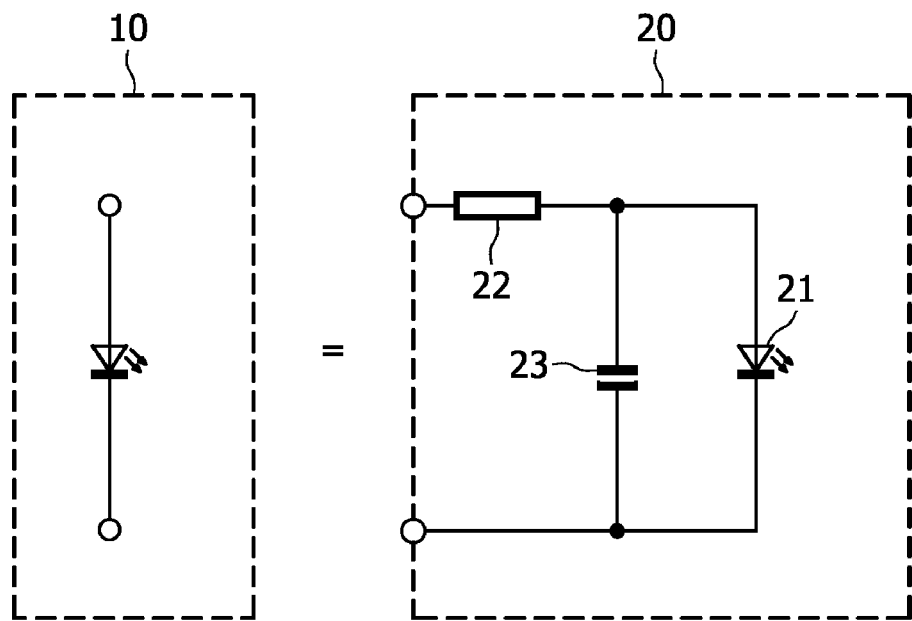
FIG. 2 shows an equivalence of an organic light emitting diode.

The equivalence 20 of an organic light emitting diode 10 shown in the FIG. 2 comprises a diode 21 coupled in parallel to a capacitor 23. The parallel diode 21 and capacitor 23 are coupled to a resistor 22 serially.

Figure 3:
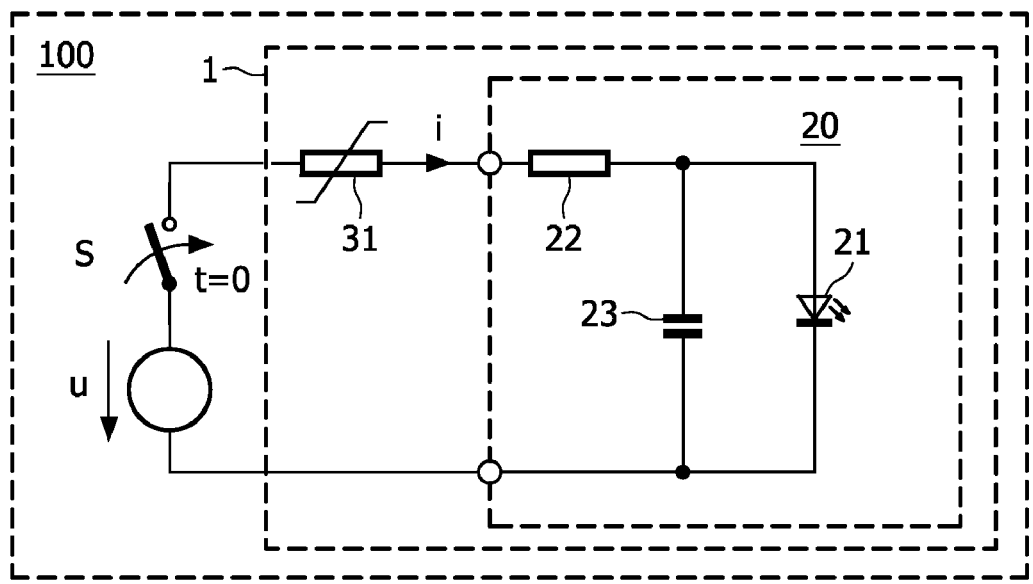
FIG. 3 shows a device according to the invention comprising a first organic light emitting diode arrangement according to the invention.

The device 100 according to the invention shown in the FIG. 3 comprises a first organic light emitting diode arrangement 1 according to the invention. This first organic light emitting diode arrangement 1 comprises the equivalence 20 coupled to the source u,i and switch S shown in the FIG. 1 via a negative temperature coefficient resistor 31.

Figures 1, 4:
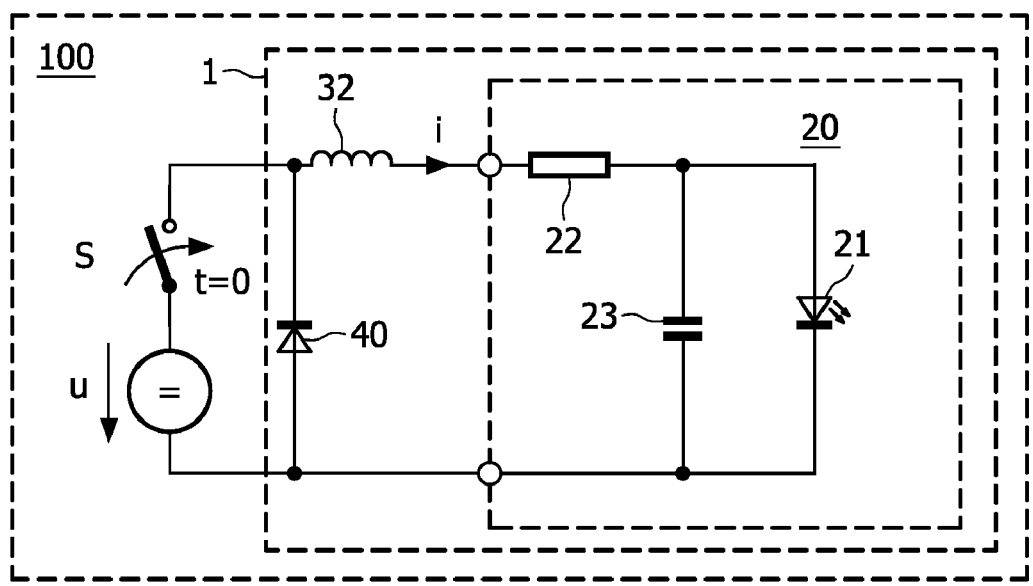
FIG. 4 shows a device according to the invention comprising a second organic light emitting diode arrangement according to the invention coupled to a DC source (FIG. 4-1) and to an AC source (FIG. 4-2)
Figures 2, 4:
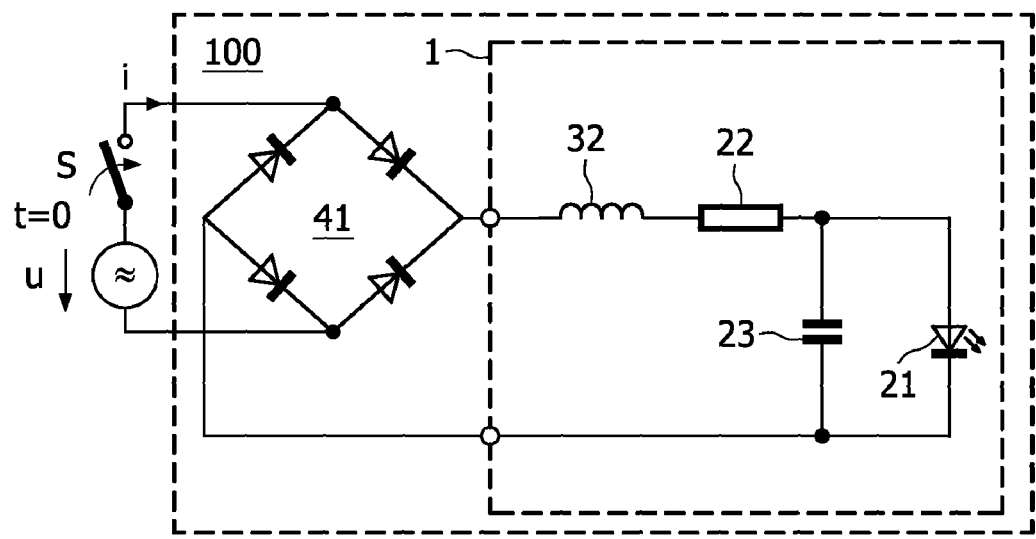

The device 100 according to the invention shown in the FIG. 4 comprises a second organic light emitting diode arrangement 1 according to the invention. This second organic light emitting diode arrangement 1 comprises the equivalence 20 coupled to the source u,i and switch S shown in the FIG. 1 via a series inductor 32. In the FIG. 4-1, the source is a switchable DC source, whereby a freewheel diode 40 might need to be coupled in parallel to the switchable DC source for commutation purposes, to avoid large voltage spikes when turning the DC source off. In the FIG. 4-2, the source is a switchable AC source with a rectifier bridge 41, in which case the rectifier bridge 41 may take care of the commutation. A rectifier bridge for example comprises at least one diode and usually comprises two or more diodes such as for example four diodes.

The source u,i and/or the switch S may form part of the device 100 or not, and may form part of the organic light emitting diode arrangement 1 or not. In fact, in case of the source being an AC source in combination with for example a rectifier bridge, at least the AC source will generally not form part of the device and the arrangement. The negative temperature coefficient resistor 31 and the series inductor 32 are examples of a circuit 31-32 for, during a first time interval that follows a switch-on, limiting a current through the organic light emitting diode arrangement 1 more than during a second time interval that follows the first time interval. In practice, in an organic light emitting diode arrangement 1, two or more organic light emitting diodes may be coupled serially and/or in parallel, and single tiles and multi tiles may be used.

Figure 5:
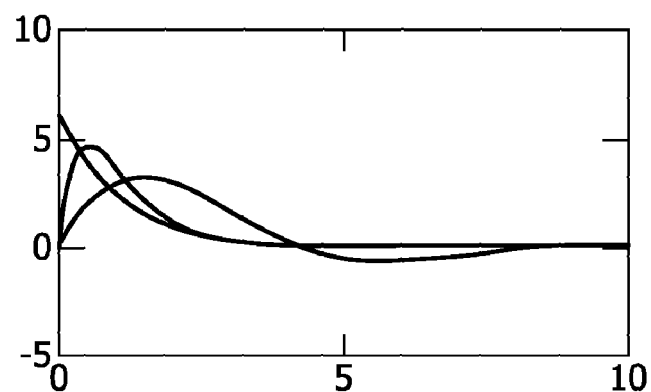
FIG. 5 shows a current of a series resonant RLC circuit for a sub critical, critical and super critical situation.

The current of a series resonant RLC circuit for a sub critical (less extreme), critical and super critical situation (most extreme) is shown in the FIG. 5 as a function of time in μs.

Figure 6:
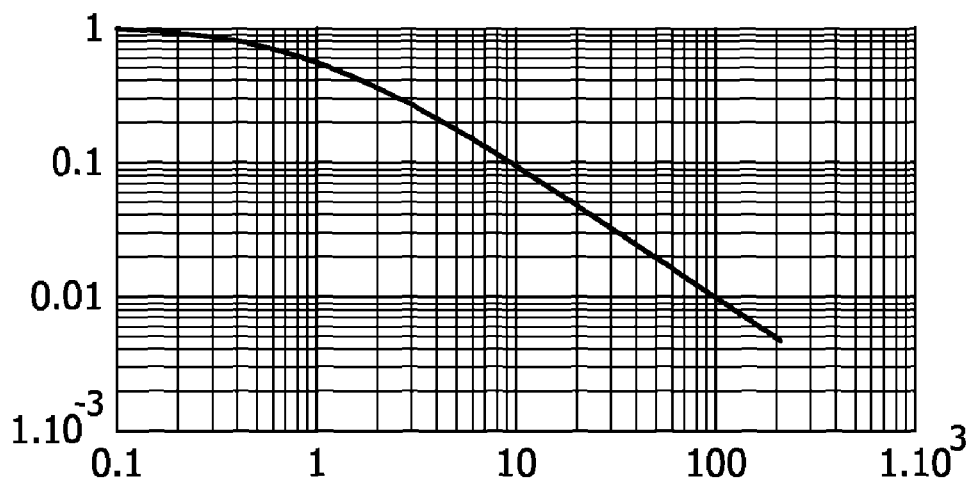
FIG. 6 shows a peak inrush current versus a series inductor.

The peak inrush current in units of $U_0/R$ is shown in the FIG. 6 as a function of values of a series inductor ($1/R*\sqrt{L/C}$).

Figure 7:
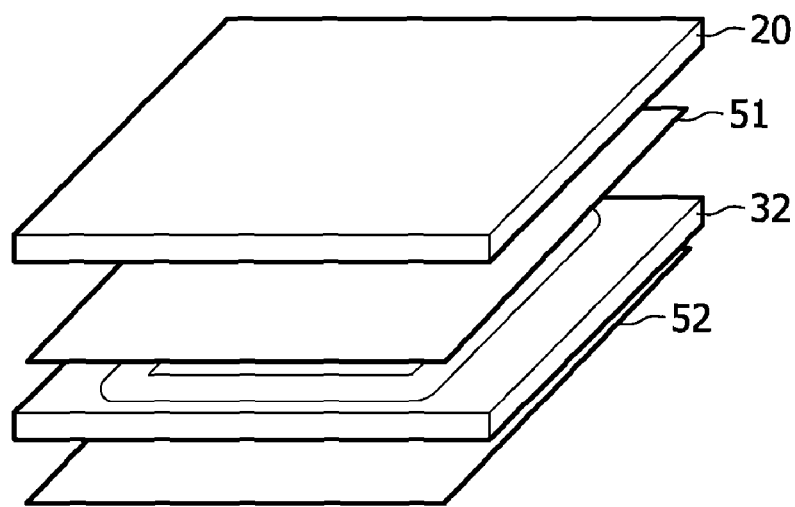
FIG. 7 shows an integration of an organic light emitting diode and an inductor.

The integration of an equivalence 20 of an organic light emitting diode 10 and an inductor 32 is shown in the FIG. 7. In this case, the organic light emitting diode arrangement 1 is a layered arrangement comprising a first layer with (an equivalence 20 of) an organic light emitting diode 10 and a second layer with the series inductor 32. The series inductor 32 may for example be a spiral inductor on a flex foil. Higher impedance values may be reached by sandwiching the flex foil between layers 51 and 52 of ferrites and/or mu metals.

Figure 8:
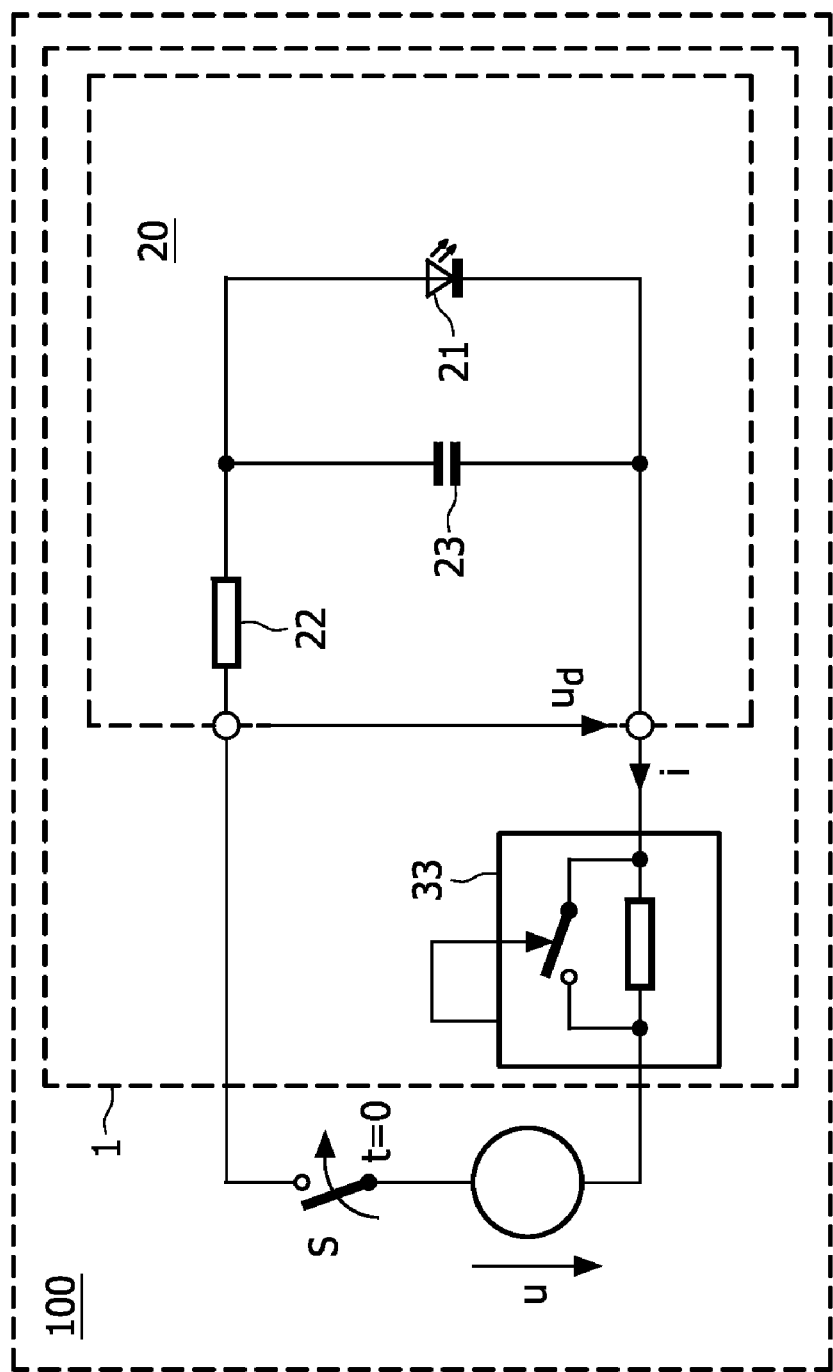
FIG. 8 shows a device according to the invention comprising a third organic light emitting diode arrangement according to the invention.

The device 100 according to the invention shown in the FIG. 8 comprises a third organic light emitting diode arrangement 1 according to the invention. This third organic light emitting diode arrangement 1 comprises the equivalence 20 coupled to the source u,i and switch S shown in the FIG. 1 via a switchable resistor 33 that is not bridged during the first time interval and that is bridged during the second time interval.

Figure 9:
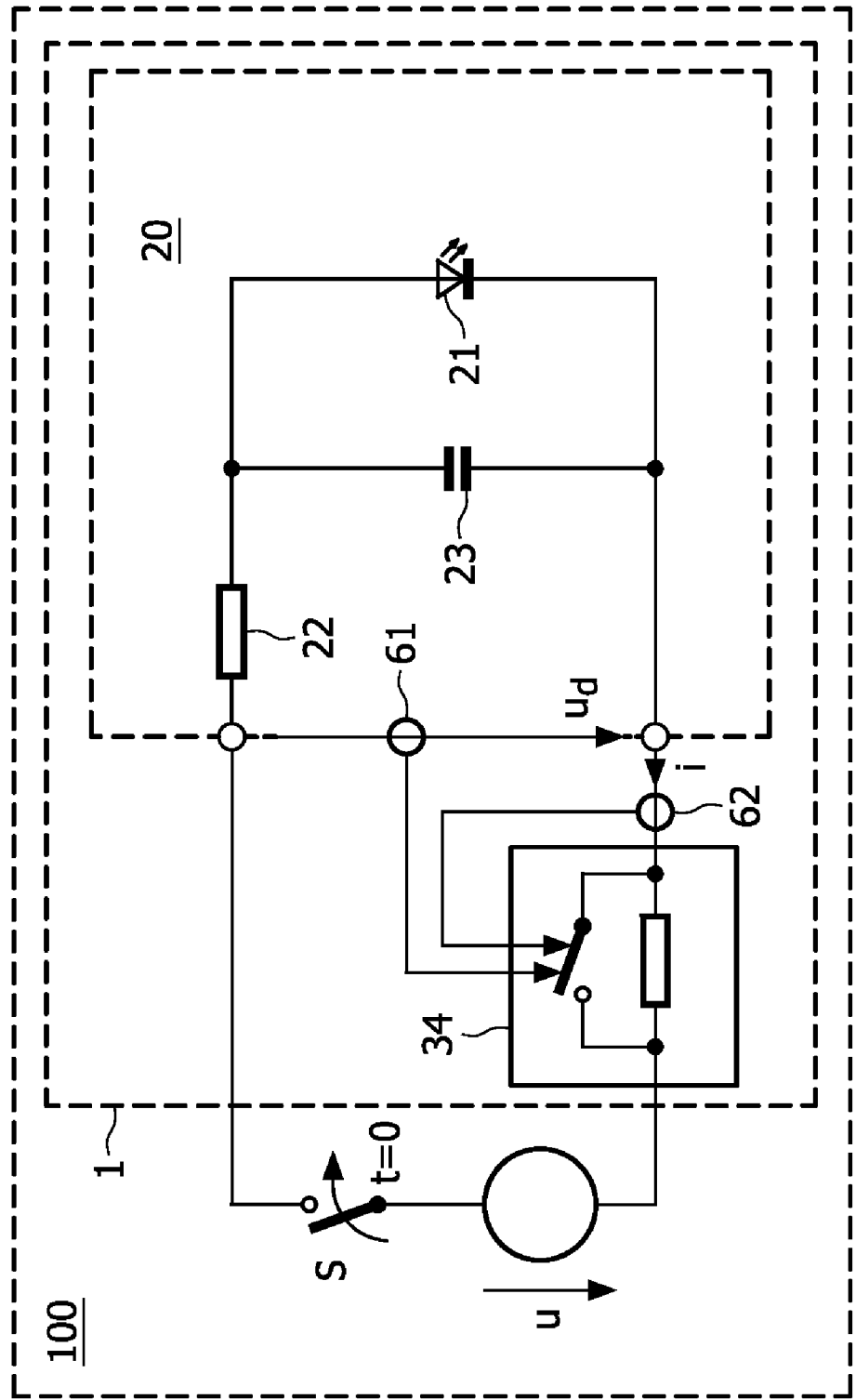
FIG. 9 shows a device according to the invention comprising a fourth organic light emitting diode arrangement according to the invention.

The device 100 according to the invention shown in the FIG. 9 comprises a fourth organic light emitting diode arrangement 1 according to the invention. This fourth organic light emitting diode arrangement 1 comprises the equivalence 20 coupled to the source u,i and switch S shown in the FIG. 1 via a switchable resistor 34 that is bridged in response to a detection of a value of the current exceeding a threshold value. Thereto, a voltage detector 61 for detecting a voltage across the equivalence 20 or the arrangement 1 may be used and/or a current detector 62 for detecting a current flowing through the equivalence 20 or the arrangement 1 may be used. The current detector 62 gives a direct indication of a value of the current, the voltage detector 61 gives an indirect indication of this value.

Figure 10:
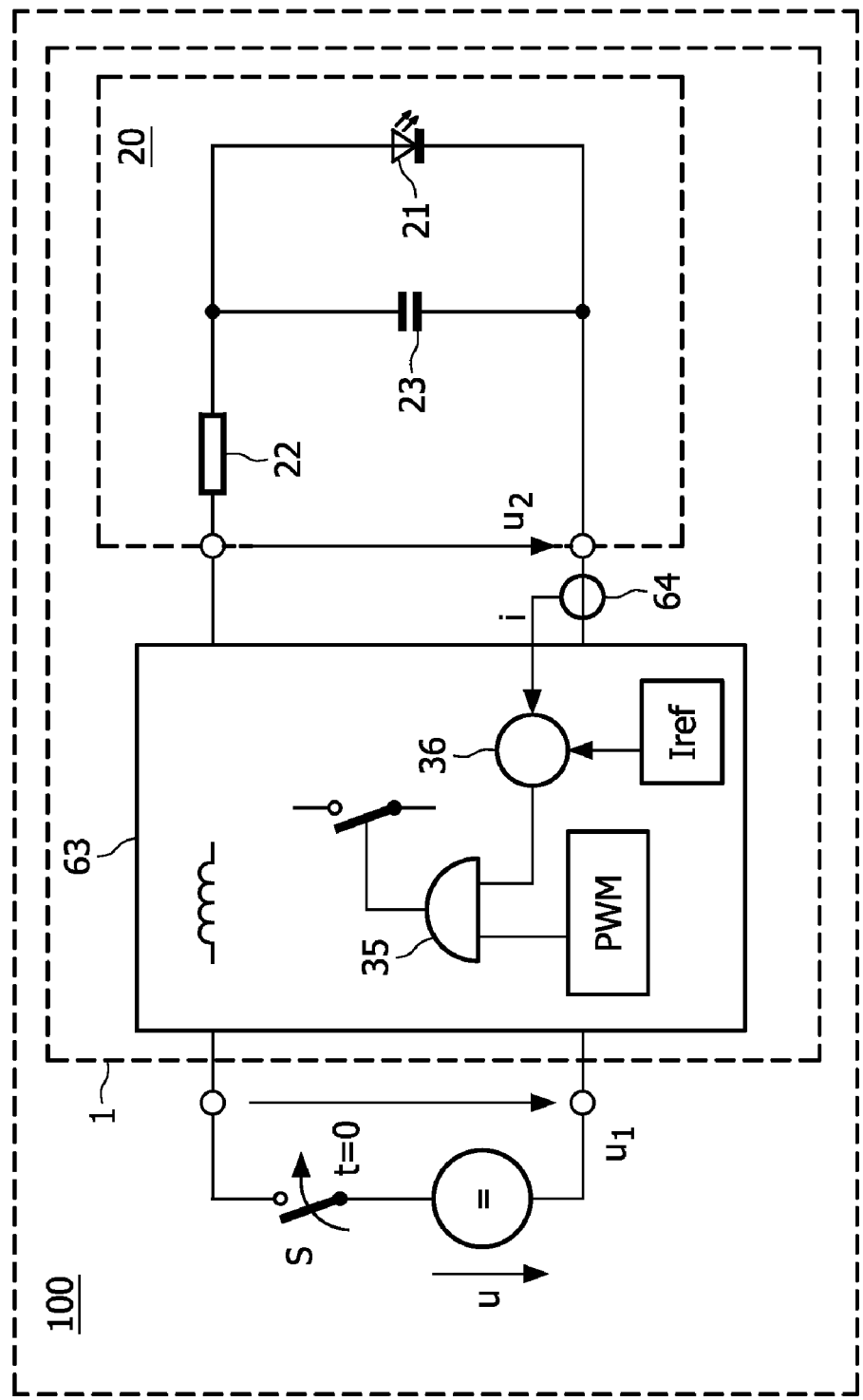
FIG. 10 shows a device according to the invention comprising a fifth organic light emitting diode arrangement according to the invention.
Figure 11A:
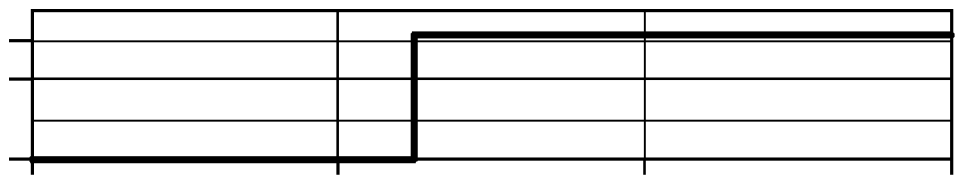
FIG. 11 shows an inrush current for a DC-driven organic light emitting diode on a short time scale.
Figure 11B:
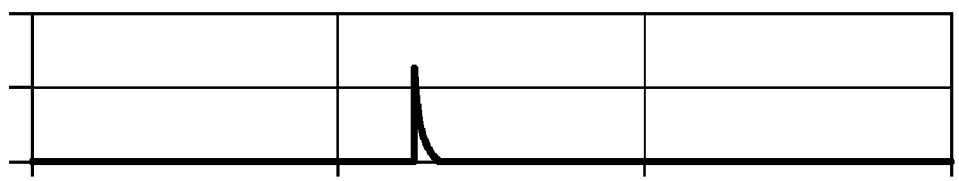
Figure 11C:
Figure 11D:
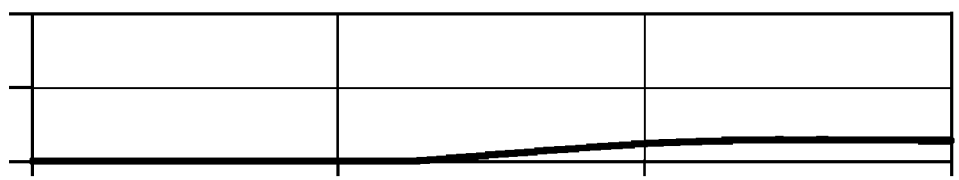
Figure 12A:
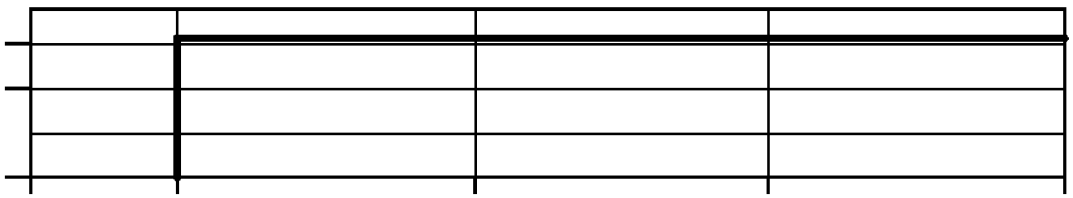
FIG. 12 shows an inrush current for a DC-driven organic light emitting diode on a long time scale.
Figure 12B:
Figure 12C:
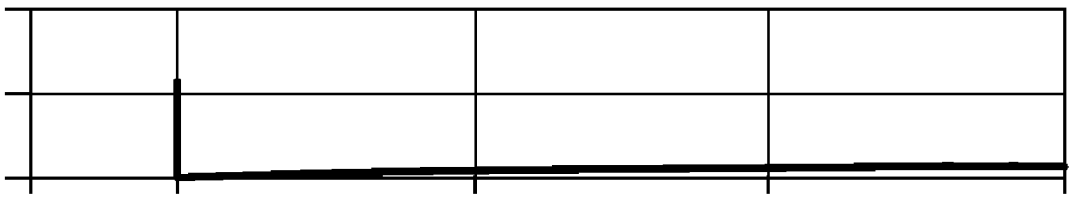
Figure 12D:
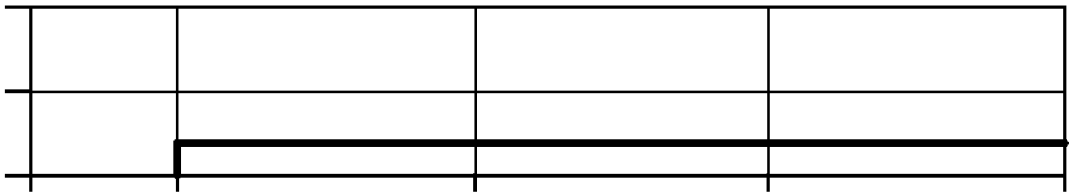

The device 100 according to the invention shown in the FIG. 10 comprises a fifth organic light emitting diode arrangement 1 according to the invention. This fifth organic light emitting diode arrangement 1 comprises the equivalence 20 coupled to the source u,i and switch S shown in the FIG. 1 via a converter 63 that is controlled in response to a detection of a value of the current. Thereto, a current detector 64 for detecting the current flowing through the equivalence 20 or the arrangement 1 may be used. The converter 63 for example comprises a prior art pulse width modulator for controlling one or more switches and for example comprises in addition a comparator 36 for comparing the current with a reference current and a gate 35 for overruling the modulator in response to a comparison result.

In the FIG. 11, an inrush current for a DC-driven organic light emitting diode on a short time scale (msec range) is shown (A shows a voltage being turned on, B shows an inrush current without limitation, C shows an inrush current limited by a negative temperature coefficient resistor, and D shows an inrush current limited by a series inductor).

In the FIG. 12, an inrush current for a DC-driven organic light emitting diode on a long time scale (sec range) is shown (A shows a voltage being turned on, B shows an inrush current without limitation, C shows an inrush current limited by a negative temperature coefficient resistor, and D shows an inrush current limited by a series inductor).

Figure 13A:
FIG. 13 shows an inrush current for an AC-driven organic light emitting diode.
Figure 13B:
Figure 13C:
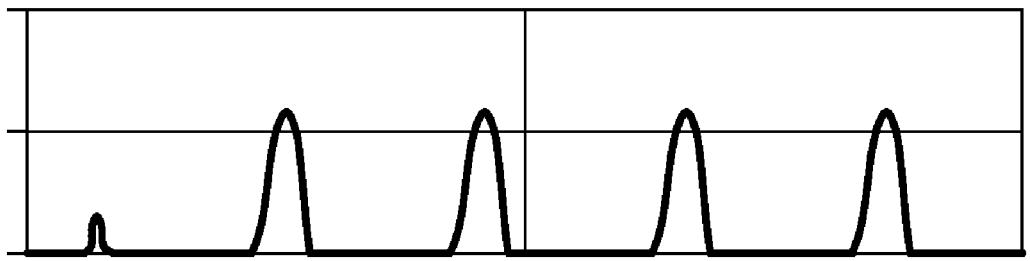

In the FIG. 13, an inrush current for an AC-driven organic light emitting diode is shown (A shows an inrush current without limitation, B shows an inrush current limited by a negative temperature coefficient resistor, and C shows an inrush current limited by a series inductor) as a function of time (msec range).

Figures 14A, 14B, 14C, 14D, 14E, 14F:
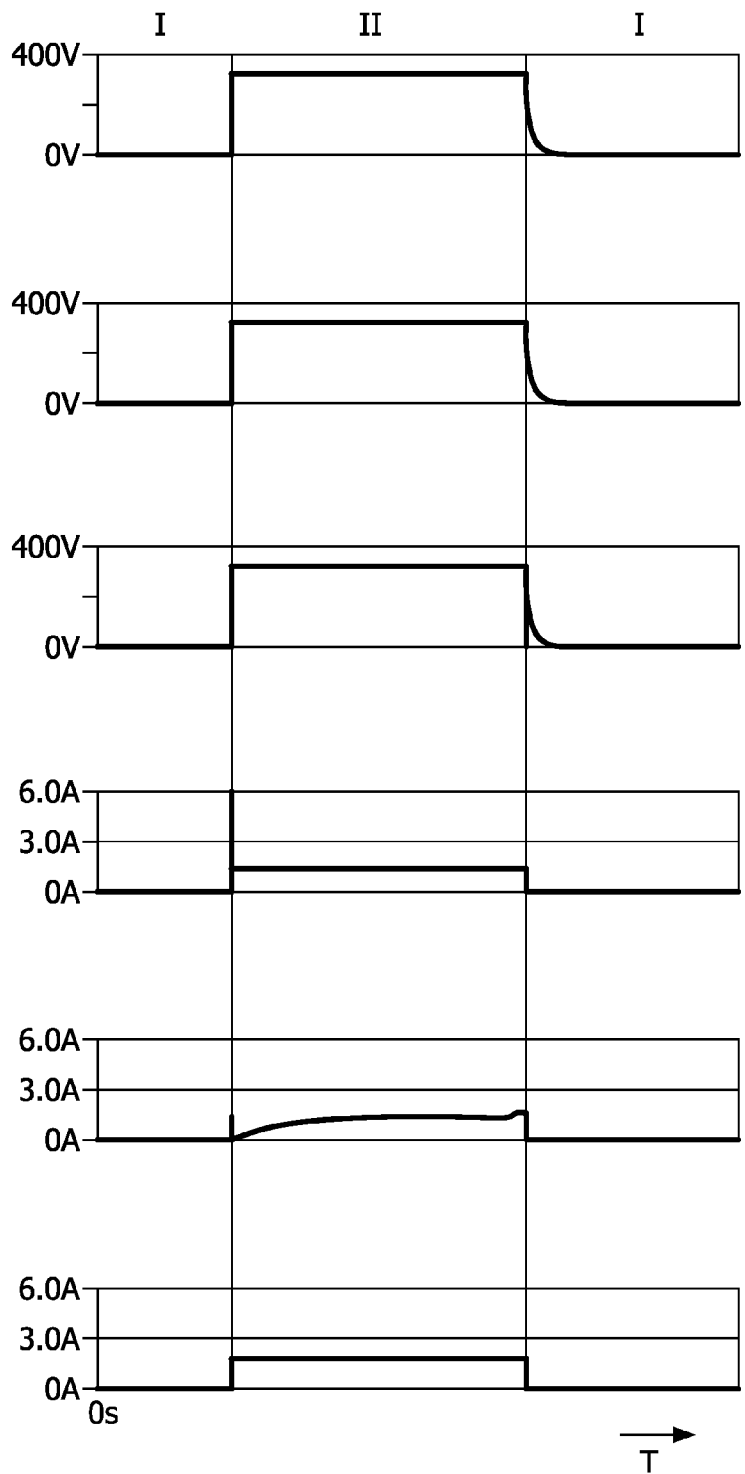
FIG. 14 shows voltages and currents for different organic light emitting diode arrangements.

In the FIG. 14, voltages and currents for different organic light emitting diode arrangements according to the invention are shown for an off situation indicated by I and for an on situation indicated by II as a function of time T (A shows a voltage across a prior art arrangement, B shows a voltage across an arrangement with a negative temperature coefficient resistor, C shows a voltage across an arrangement with a series inductor, D shows a current through a prior art arrangement, E shows a current through an arrangement with a negative temperature coefficient resistor, and F shows a current through an arrangement with a series inductor).

In other words, the organic light emitting diode arrangement 1 comprises a circuit 31-36 for, during a first time interval that follows a switch-on, limiting a current through the organic light emitting diode arrangement 1 more than during a second time interval that follows the first time interval. This circuit 31-36 may be a passive circuit 31-32 or an active circuit 33-36.

Passive inrush current limitation may be suited for off line applications where the organic light emitting diode arrangement 1 is directly driven by a power line. A single organic light emitting diode (OLED) has a small forward voltage and therefore it may be necessary to connect n diodes in series to match a peak value of the power line voltage. In this case the use of an additional power converter can be avoided to reduce cost. It is therefore desirable to apply low cost solutions for inrush current limitation.

A maximum current during turn on may be determined as follows, whereby it is assumed that n OLEDs are connected in series and that an equivalence with a sufficient accuracy of an OLED consists of an ITO Resistance R, an internal self-capacitance C and an OLED current-voltage characteristic i=i(u), see also the FIGS. 1 and 2. The maximum current Ipk during turn on is then Ipk=Uo/R.

A simple example is now presented to quantify the size of the inrush current for an OLED which is typical for general illumination, whereby it is assumed that a desired light output LO=2000 lm, a total area for the lighting area Ftotal=1 m$^2$, and a DC input voltage Uo=311V.

A single OLED is for example defined by a current efficiency Ieff=40 cd/A, a diode characteristic i=i(u)=a*(u−Uf)$^2$ with a forward voltage Uf=3V, an ito resistance of R=0.5Ω, an internal self capacitance of C=200 pF/mm$^2$, and a gain a=0.5 mA/(V*mm)$^2$.

The luminous intensity assuming a lambertian characteristic may be Lolamb=LO/pi=636.62Cd. The number n of the series connected OLEDs can be estimated by n=Uo/Uf which is n=103. The total current of a single OLED tile may be I=Lolamb/Ieff=15.9 A. The current for a series connection of n OLED tiles may be: Inom=I/n=0.154 A. The inrush current during turn on is then given by: Iinrush=Uo/(n*R)=6.2 A. This value is 6.2/0.16=39 times higher than the nominal current. The exact transient behavior is shown in the FIGS. 11 and 12. Which clearly demonstrates the huge transient peak at turn on t=0.

This high current may seriously affect all components in the active current path, like fuses, switches and the OLED itself. The situation is similar for AC-driven OLEDs, except that the calculation is much more complicated. The FIG. 13 shows the current waveforms when the OLEDs are driven by a sinusoidal input voltage with an effective voltage of Ueff=220V. Qualitatively nothing has changed; again there is a big input current during turn on. The maximum appears when t=0 is at maximum input voltage.

A thermal or negative temperature coefficient (NTC) resistor may be used as a current limiter, see also the FIG. 3. Compared to a simple ohmic resistor the NTC has the advantage of reduced losses during normal operation. One makes use of the fact that the resistance of a NTC is decreased for higher temperatures. When the OLED is not in use the NTC is at environmental temperature T1 with a nominal value R1. When the OLED is turned on the current is limited by the NTC resistance R1 and the series resistance of all OLED tiles: n*R+R1. After being turned on the NTC heats itself up and the resistance drops to R2 at temperature T2. It may be an objective of a designer to select the right properties of the NTC so that during turn on the inrush current is low enough while for normal operation the added loss should be small.

While the use of an NTC is quite simple and cheap it may have a drawback that added losses might be still significant and cannot be avoided. Due to the material properties a large resistance variation leads to an excessively high NTC temperature. A main drawback may however be that the NTC is not resetable, i.e. once it has heated up the current limitation function is lost. It usually takes several seconds or minutes until the NTC has cooled down enough to limit the current for another turn-on cycle.

A series inductor may be used as a current limiter, see also the FIG. 4. The disadvantages of the NTC approach can be strongly reduced by using an inductor in series to the OLED tiles. The OLED with a series inductor can be described by a simple series resonant network neglecting the non-conducting OLED during turn-on. The resulting current is well known from the literature. The current response is shown in the FIG. 5 where the qualitative behavior depends on the eigenvalues λ1, λ2 of the describing network equation. The eigenvalues are completely defined by the component values:

$$\lambda_1 = \frac{-R}{2L} + \sqrt{\frac{R^2}{4L^2} - \frac{1}{LC}}$$

$$\lambda_2 = \frac{-R}{2L} - \sqrt{\frac{R^2}{4L^2} - \frac{1}{LC}}$$

The peak value of the current after turn on is $$ipk = \frac{-U_o}{L \cdot \lambda_1} \cdot \left(\frac{\lambda_1}{\lambda_2}\right)^{\frac{\lambda_2}{\lambda_2 - \lambda_1}}$$

For the critical case λ1=λ2 the equation for ipk simplifies to:

$$ipk_{crit} = \frac{U_o}{R} \cdot \frac{2}{e}$$

The design of the series inductor is primarily determined by the desired suppression factor for the current. If the peak current is normalized to Uo/R, i.e. the current without limiter, the series inductance can be read from the diagram in the FIG.

6 where Zo denotes the characteristic impedance defined as: Zo=sqrt(L/C), where L denoted the added series inductance and C represents the self capacitance of the n OLED tiles which can be approximated by: C=Ctile/n. For large inductance values the relation of the suppression factor becomes linear:

$$\frac{ipk}{\frac{U_o}{R}} = \frac{R}{Z_o}$$

i.e. for a higher characteristic impedance the suppression is higher.

A first design target may be Inom=Ipk, i.e. the peak oscillating current after turn-on corresponds to the nominal current during steady state operation. With Inom=I/n and Ipk=U·o/Zo it follows: I/n=Uo/Zo or Zo=n*Uo/I. Observing Zo=sqrt(L/C) the ratio L/C is determined: $L/C=(n*Uo/I)^2$, where L denotes the total inductance of all OLED in series. The inductance per tile is then: Ltile=L/n. Using the DC example from above, with I=15.9 A, Ftile=Ftotal/n=97 cm$^2$, C=200 pF/mm$^2$*Ftile/n=20 nF, the total series inductance is L=82 mH or 82 mH/n=0.8 mH per tile. This area is sufficiently large enough to integrate the inductor on the substrate of the OLED.

An example is shown in the FIG. 7 where the series inductance is realized as a spiral inductor on flex foil. The flexfoil can be directly glued onto the substrate of the OLED. For higher inductance values it might be necessary to combine the flex foil indictor with additional layers of plastic ferrites and/or mu metal foils. Maximum inductance values can be reached by sandwich the flexfoil between layers of ferrite and/or mu metal. If necessary even a multilayer structure can be used. Integrating the inductor in this way preserves the form factor of the OLED devices, i.e. it remains very flat. Making use of wire wound inductors is of course possible but usually increases the thickness of the OLED device.

It should be noted that, for a turn-off, a commutation path for the OLED current might be required. The inductor enforces a specific current flow even when the switch is turned off. If a commutation path is missing a result might be a huge voltage spike across the switch. Whether or not additional components are required to realize the commutation path depends on a topology. In case of a switchable DC source where the OLED is directly connected to the DC source with a single (for example mechanical) on/off switch, no commutation path is present. For this situation, additional components may be required. One option might be to use a (freewheel) diode in parallel to the input of the OLED arrangement as shown in the FIG. 4-1. In case of a switchable AC source as shown in the FIG. 4-2, where a bridge rectifier is used to drive the OLED, no additional components are required, because in the off state the bridge rectifier itself may serve as a commutation path.

Active inrush current limitation is defined by a utilization of a switching element. This switching element can be activated or deactivated either to limit the current or to bypass the current limiting element for normal operation. Various examples are shown in the FIG. 8-10. A special case is shown in the FIG. 10 where the internal switch of the DC/DC converter is used as the limiter, i.e. the switch is disabled when the current through the OLEDs exceed a predefined value otherwise the switch is enabled for normal operation.

Summarizing, organic light emitting diode arrangements 1 are, to protect them against an effect of a switch-on, provided with circuits 31-36 for, during a first time interval that follows a switch-on, limiting a current through the organic light emitting diode arrangement 1 more and for, during a second time interval that follows the first time interval, limiting the current less. The circuit 31-36 may be passive such as a negative temperature coefficient resistor 31 or a series inductor 32 or may be active such as a switchable resistor 33 that is not bridged during the first time interval and that is bridged during the second time interval or a switchable resistor that is bridged in response to a detection of a value of the current exceeding a threshold value or such as a part of a converter 63 that is controlled in response to a detection of a value of the current.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An organic light emitting diode arrangement comprising a circuit for, during a first time interval that follows a switch-on, limiting a current through the organic light emitting diode arrangement more than during a second time interval that follows the first time interval, wherein the circuit comprises an active circuit including a switchable resistor that is not bridged during the first time interval and that is bridged during the second time interval.

2. An organic light emitting diode arrangement comprising a circuit for, during a first time interval that follows a switch-on, limiting a current through the organic light emitting diode arrangement more than during a second time interval that follows the first time interval, wherein the circuit comprises an active circuit including a switchable resistor that is bridged in response to a detection of a value of the current exceeding a threshold value.

3. The organic light emitting diode arrangement of claim 2, further comprising a voltage detector for detecting a voltage across an organic light emitting diode, wherein the value of the current is determined from a voltage detected by the voltage detector.

4. A device, comprising:
   a driver configured to receive an input voltage from a switchable supply and in response thereto to supply power to a load comprising at least one organic light emitting diode, the driver including:
   a pulse width modulator (PWM) configured to output a PWM control signal, and
   a switching device configured to control a current supplied to the load; and a current detector configured to detect the current supplied to the load, wherein the device further comprises an inrush current limiting circuit configured to respond to a switch-on of the switchable power supply to limit the current supplied to the load for a first time period more than during a second time interval that immediately follows the first time interval, wherein the inrush current limiting circuit comprises:

a comparator configured to compare the detected current to a threshold value and in response thereto to output a gating signal; and a gating device configured to receive the gating signal and the PWM control signal, wherein the gating device is further configured to supply the PWM control signal to a control terminal of the switching device when the detected current is less than the threshold value, and to disable connection of the PWM control signal to the control terminal of the switching device when the detected current is greater than the threshold value.

5. The device of claim 4, further comprising the load comprising at least one organic light emitting diode.

\* \* \* \* \*